W. S. TURNER.
Cotton-Planter.

No. 203,960. Patented May 21, 1878.

Attest:
C. Wooten,
A. T. Sexton

Inventor:
W. S. Turner

UNITED STATES PATENT OFFICE.

WILLIAM S. TURNER, OF PHILLIPS COUNTY, ARKANSAS.

IMPROVEMENT IN COTTON-PLANTERS.

Specification forming part of Letters Patent No. 203,960, dated May 21, 1878; application filed July 25, 1876.

*To all whom it may concern:*

Be it known that I, WILLIAM S. TURNER, of the county of Phillips and State of Arkansas, have invented a new and useful Improvement for Planting of Cotton, which improvement is fully set forth in the following specification.

Figure 1:
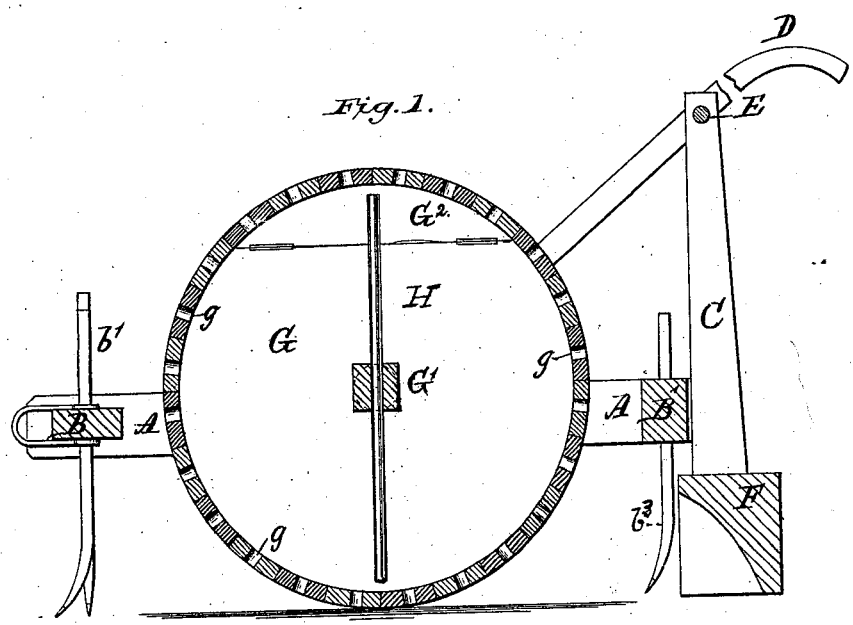
Figure 2:
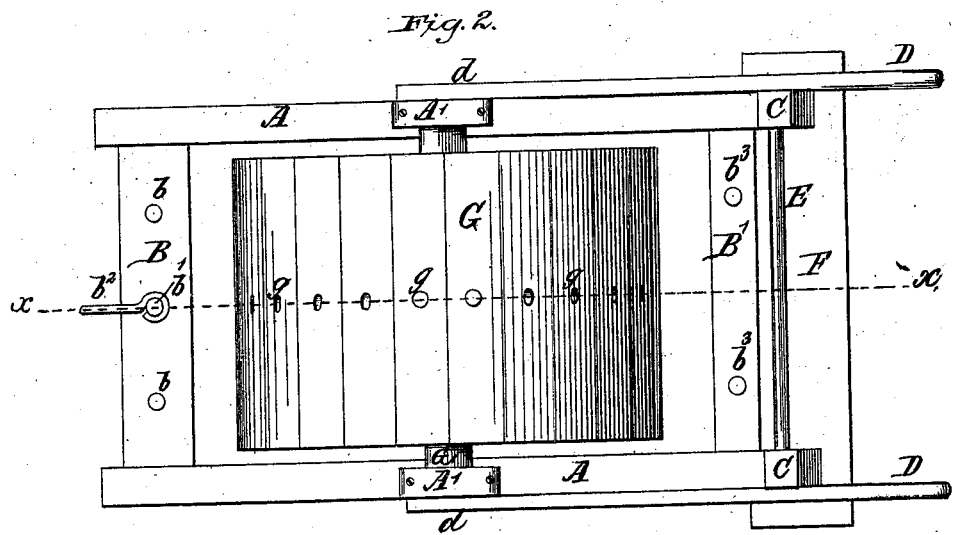

In the drawings, Figure 1 is a vertical section of my improved cotton-seed planter, taken on line $x\,x$ of Fig. 2. Fig. 2 is a top-plan view of the machine.

The horizontal portion of the machine is composed of the side sills A A and the cross-girts B. B. C C are uprights, rigidly secured to the frame A B B′ by mortise and tenon or other suitable means, and are for purposes to be hereinafter set forth.

Near their centers the sills A A are provided with bearing blocks or boxes, A′ A′, in which to mount the axle of the hopper.

Three teeth, $b\,b\,b^1$, are carried by the front cross-girt B, the two outer teeth, $b\,b$, serving to loosen and break up the soil on each side of the seed-furrow. The central tooth, $b^1$, is curved forward at its lower end, and acts as a drill to open a furrow in which the seed is to be dropped. The shanks of these teeth extend a short distance above the girt B, thus permitting them to be adjusted according to the depth they should penetrate the soil. $b^2$ is a clevis for attaching the draft to the machine, fastened by means of the central tooth, $b^1$.

Two additional harrow-teeth, $b^3\,b^3$, are carried by the rear girt $B^1$, for the purpose of further loosening the soil and assisting in the operation of covering the seeds after they have been planted.

D D are handles fastened to the frame at $d\,d$. Near their upper ends they are secured to the uprights C C, and, in order to render this portion of the frame perfectly firm, I join the handles D D and the uprights C C by a cross-piece, E.

The uprights C C, at their lower ends, carry the coverer F, made to rest on the ground, and provided with a curved recess, as shown in cross-section, Fig. 1, which serves to collect the earth and more perfectly cover the seed.

G is the cylindrical hopper for carrying and dropping the seed. It is secured to and rotates with the axle $G^1$, which is mounted in the bearing blocks or boxes A′ A′. The rotation of this hopper is caused by its contact with the ground. There are apertures $g$ at regular intervals around its perimeter and at points equidistant from its ends, through which apertures the seeds pass into the furrow formed by the plow-tooth $b^1$.

$G^2$ is a segmental lid or cap, hinged at one end, through which to insert seed into the hopper. In order to overcome the difficulty which is experienced from the cotton-seeds adhering together, the axle $G^1$ carries a separating-rod, H, whose length is nearly equal to the internal diameter of the cylinder, by means of which the clogging of the apertures $g$ is prevented.

From the above description of the construction and operation of my planter it will be seen that the various devices and their adjustments adapt it for doing good work under a great variety of circumstances, and especially in ground which is somewhat damp, or from other cause is liable to pack, as under such circumstances the rear teeth $b^3\,b^3$ will assist in covering the seed and in leaving the earth in a loose, pulverized condition, even though the seed-hopper shall have packed it after the front teeth $b\,b^1\,b^1$ have properly fitted it for the reception of the seed.

Another marked advantage which grows out of the new combination of devices found in my planter is this: The front drill-tooth, $b^1$, makes a comparatively deep furrow, in which seed is deposited from the holes in the front side of the hopper, and as the hopper passes over these seeds it covers them by crowding into this furrow a part of the earth which has been ridged up by the three teeth $b\,b\,b^1$.

The furrow is not, however, entirely filled by this rolling action of the hopper; hence additional seed are deposited in the shallow furrow or drill which remains from the holes in the rear side of the hopper, which latter seed are finally covered with finely-pulverized earth by the joint action of the teeth $b^3\,b^3$ and the coverer F, so that in case the weather succeeding the planting be wet and cold, which would rot the deeply-planted seed, those which are covered but slightly will come up; whereas, if the weather be hot, dry, and windy, and dries up the shallowly-planted seed, then those which are covered deeply will grow, thus insuring a good stand of plants under all ordinary conditions.

What I claim is—

The herein-described cotton-seed planter, consisting of the rolling hopper, provided with perforations $g$, in combination with the front drill-tooth $b^1$, the pulverizing-teeth $b\ b$, the rear teeth $b^3\ b^3$, coverer F, and supporting-frame, substantially as set forth.

W. S. TURNER.

Witnesses:
C. WOOTEN,
A. T. SEXTON.